June 26, 1923.
C. L. DREW
LIGHT GAUGE
Filed Nov. 17, 1921
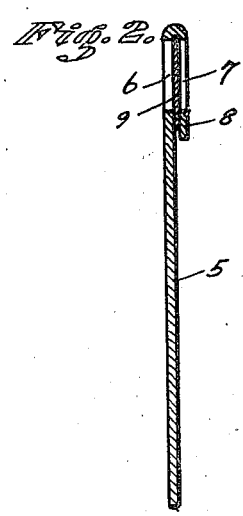
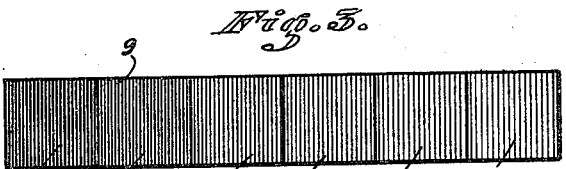
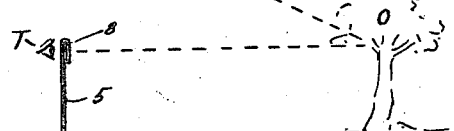
INVENTOR Patented June 26, 1923.

1,460,055

UNITED STATES PATENT OFFICE.

CLAYTON L. DREW, OF SAN FRANCISCO, CALIFORNIA.

LIGHT GAUGE.

Application filed November 17, 1921. Serial No. 515,914.

*To all whom it may concern:*

Be it known that CLAYTON L. DREW, a citizen of the United States of America, residing in the city of San Francisco and State of California, has invented certain new and useful Improvements in a Light Gauge, of which the following is the specification.

This invention relates to a new, novel and useful improvement in exposure meters for photographic use.

The principal object of this invention is to produce a cheap and convenient meter, which will accurately determine the activity of the light being reflected from the object to be photographed.

Another object is to produce a meter of this character wherein simplicity is the principal factor.

Another object is to produce a meter which may be used by those persons commonly termed " amateurs," thereby enabling them to secure a perfect picture under varying light conditions.

Other objects and advantages will be seen as the description proceeds.

In this specification and the annexed drawings the invention is illustrated in a form considered to be the best, but it is to be understood that the invention is not limited to said form because it may be embodied in other forms, and it is also to be understood that in and by the claim following the description, it is desired to cover the invention in whatsoever form it may be embodied.

In the drawings, Figure 1 is a plan view of my device.

Figure 2 is a cross-section taken on the line II—II of Figure 2.

Figure 3 is a detail view of the viewing strip.

Figure 4 is a diagrammatic view illustrating the use of my device.

In the drawings, like numerals refer to corresponding parts in the several views.

In the taking of pictures it is essential that the right stop be employed together with the right shutter speed under varying conditions of light. In order that the amateur may ascertain these right stops and speeds I propose to have him view the object, thereby measuring the reflected light from the object, and by thus determining the amount of reflected light, he is enabled to determine the correct speeds and stops, as will be hereinafter shown.

In the drawings, the numeral 5 designates a plate, which may be of metal, fibre or any similar substance, which plate is adapted to have engraved, embossed or otherwise formed upon its face a chart, designated as a whole by the letter " B."

The chart consists of eight vertical columns and eight horizontal divisions. In the first vertical column I have put the standard "$f$" values and in the eighth column I have put the U. S. values. In the remaining six columns I have put shutter speeds. Above the six columns containing the shutter speeds I have formed windows 6 and 7, the window 7 being formed in an over-lapping portion 8 of the plate 5.

A film 9 is adapted to be placed between the plate 5 and the over-lapping portion 8, as is best shown in Figure 2. This film 9 is formed of squares of varying density as is best shown at $c$, $d$, $e$, $f$, $g$, and $h$ of Figure 3. This film is preferably made of ordinary photographic film, the varying densities being produced by varying exposures. This film may, however, be made in many other ways, without departing from the spirit of the invention.

The operation of my device is as follows: A person holds the plate 5 to the eye so that he is enabled to look through one of the windows 6 and 7, and moves the same before the eye until the object which he wishes to photograph may be plainly seen through the film.

By then noting which column the window is above, the correct speed and shutter opening can be determined.

For instance, if the object may be plainly seen through the film portion marked " F " and it is desired to use stop 7.7, it will be seen that the speed opposite this stop is 1/10, here indicated by the number 10 on the chart. As this is too slow a speed to hold the camera in the hand, it will be necessary to either place the same upon a tripod or to use the next larger stop, which would be 6.3.

This gauge is equally adaptable to cameras having shutters marked 25, 50 and 100 and provided with a lens having an aperture of $f$ 7.7. The correct apertures and speeds are given in that portion of the table bounded by the double line 11.

By referring to Figure 4, it will be seen how the light from the source such as the sun "s" strikes the object "o" and is reflected through the gauge 5 to the eye "t".

As the film strip 9 is gelatin coated the same is susceptible to the humidity in the air, with the result that the gauge so equipped appears to automatically take care of varying weather conditions, a factor which aids in making the gauge much more accurate under varying conditions.

Having described my invention, what I claim as new and novel and desire to secure by U. S. Letters Patent is:—

In a light gauge, a plate doubled at its top and having windows formed in said plate in the doubled portion and body, the windows in said doubled portion and body registering, said film strip having portions of varying density, said portions of said film being adapted to register with said windows, a chart formed on the face of the body of said plate, said chart having columns formed below each of said windows, figures vertically arranged in said columns, said figures designating shutter speeds, and additional columns having figures vertically arranged and denoting shutter apertures, the figures in said columns beneath said windows being in horizontal alignment with said figures in said additional columns, substantially as and for the purpose specified.

In testimony whereof I affix my signature

CLAYTON L. DREW.